United States Patent Office 3,328,402
Patented June 27, 1967

3,328,402
PYRAZINE DERIVATIVES
Max Winter, Petit-Lancy, Geneva, Switzerland, assignor to Firmenich et Cie, Geneva, Switzerland
No Drawing. Filed Feb. 21, 1964, Ser. No. 346,420
Claims priority, application Switzerland, Feb. 26, 1963, 2,415/63
5 Claims. (Cl. 260—250)

The present invention relates to new pyrazine derivatives which are useful as flavoring agents for modifying or improving the flavor and taste of foodstuffs, beverages and pharmaceutical preparations. The invention also relates to flavoring agents including said new pyrazine derivatives as well as to foodstuffs and beverages flavored by means of said derivatives.

The compounds of this invention correspond to the general formula

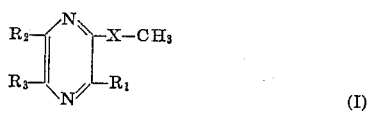

(I)

wherein X reperesents a member selected from the group consisting of oxygen and sulfur and one of the symbols $R_1$, $R_2$ and $R_3$ represents a methyl radical, the other two representing hydrogen.

I have found that the compounds of Formula I are valuable flavoring agents which have an unusually high flavoring power and which, if incorporated in minute amounts in foodstuffs and beverages, will impart to the latter a very fine flavor and taste of roasted hazelnuts, peanuts or almonds. This flavoring effect was very surprising since in pure or concentrated form the new pyrazine derivatives had a definitely unpleasant aggressive basic odor and a revolting metallic taste which by no means suggested the utility of these compounds as flavoring agents. It is only at extreme dilution that the compounds of Formula I develop a fine odor and flavor.

The pyrazine derivatives of Formula I in which X is oxygen are obtained by methods known per se, e.g. by treating halogenated methylpyrazines of the formula

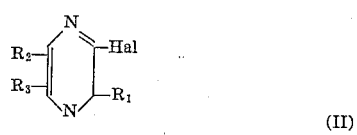

(II)

wherein Hal represents a halogen such as chlorine or bromine, and one of the symbols $R_1$, $R_2$ and $R_3$ represents a methyl radical, the other two representing hydrogen, with an alkali metal methoxide such as sodium or potassium methoxide, or with powdered potassium hydroxide in methanol.

In an analogous manner, the pyrazine derivatives of Formula I in which X is sulfur are prepared by treating methylpyrazines of Formula II with an alkali metal methylmercaptide, e.g. sodium methylmercaptide.

The halogenated methylpyrazines used as starting materials can be prepared by known methods, e.g. by treating methyl pyrazine with hydrogen peroxide according to C. F. Koelsch and W. H. Gumprecht [J. Org. Chem. 23, 1603 (1958)] and by reacting the resulting mixture of N-oxides with a phosphorus oxyhalide such as phosphorus oxychloride. This synthesis can be illustrated by the following reaction scheme:

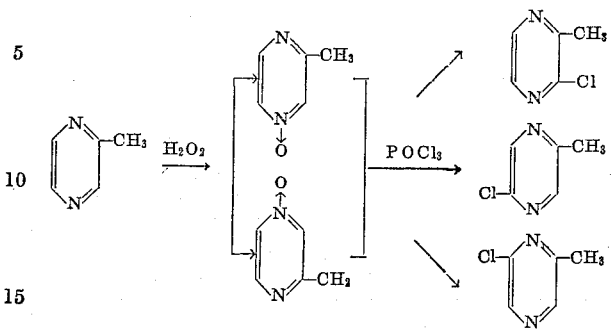

In this method a mixture of the three possible isomers of monochlorinated methylpyrazine is obtained. The treatment of this mixture with alkali metal methoxide or alkali metal methylmercaptide will also result in the formation of a mixture including the three possible isomers of methyl-methoxy-pyrazine or methyl-methylmercapto-pyrazine, respectively.[1]

According to another method the halogenated methylpyrazines used as starting materials are prepared by direct halagenation of methylpyrazine with free halogen, e.g. with chlorine in carbon tetrachloride [cf. A. Hirschberg and P. E. Spoerri, J. Org. Chem. 26, 2356 (1961)]. Again, there is obtained a mixture of the three isomers of monohalogenated methylpyrazine which, upon treatment with alkali metal methoxide or alkali metal methylmercaptide, will yield a mixture of the three possible isomers of methyl-methoxy-pyrazine or methyl-methylmercapto-pyrazine, respectively.[1]

The pyrazine derivatives of Formula I have very interesting flavoring properties and are useful for flavoring foodstuffs, beverages and pharmaceutical preparations, or for changing, improving or masking the inherent taste of these goods. Depending on the desired flavor note to be obtained the pyrazine derivatives can be incorporated in the said goods either as such or together with other flavoring ingredients. Since the pyrazines of this invention possess an exceptionally high flavoring power, minute amounts thereof are sufficient for producing the desired effects. As an illustrative example, the new pyrazine derivatives can be used in amounts as low as 10 to 20 mg. for 100 kg. of the material to be flavored. However, depending on the nature of the goods to be flavored it can be advantageous to use higher proportions of the compounds of this invention, e.g. up to 200 mg. for 100 kg. of the goods to be flavored. Amounts of more than 200 mg. will normally tend to develop an objectionable off-flavor.

The pyrazine derivatives are conveniently used in the form of dilute solutions in non-toxic edible solvents or diluents, e.g. 1 to 10% solutions, in order to achieve a uniform distribution in the goods to be flavored. Solvents or diluents which are suitable for this purpose include propylene glycol, triacetin, benzyl alcohol, practically tasteless oils, such as peanut oil, and the like. Flavoring agents comprising at least one pyrazine derivative of

---

[1] These mixtures contain about 70–80% by weight of the isomers in which the pyrazine nucleus is substituted in the positions 2 and 3, the remaining 20–30% of the mixture consisting of the other two possible isomers.

Formula I and a diluent are also part of the present invention.

The pyrazine derivates of this invention can be used in the manufacture of or for flavoring a wide variety of foodstuffs and beverages such as chocolate, ice-cream, puddings, bakery products, confectionery, milk products such as yogurt, edible fats, milk, cream, and the like.

It is also possible to incorporate the pyrazine derivates in pharmaceutical preparations which are to be taken orally.

The pyrazine derivatives of this invention can moreover be processed together with other flavoring substances into flavor essences which can be used as such or after dilution, e.g. in the solvents mentioned above. The invention also relates to these concentrated or diluted essences.

Foodstuffs and beverages having incorporated therein pyrazine derivatives of this invention have a flavor and taste resembling very closely the natural flavor and taste of roasted hazelnuts, peanuts or almonds.

The invention is further illustrated in the following examples without being limited thereto.

*Example 1*

60 g. of 30% prehydrol (0.53 mole) are dropped with stirring into a solution of 50 g. (0.53 mole) of 2-methyl-pyrazine in 600 ml. of glacial acetic acid at a temperature of 70–80° C. The reaction mixture is maintained for 10 hours at 70–80° C. and then concentrated to dryness in vacuo. The residue is taken up in 100 ml. of water, and the solution is again concentrated to dryness. The residue is directly distilled in vacuo. The main fraction distills over at 80–115° C./8 torr and crystallizes. There are thus obtained 44 g. of a product consisting of a mixture of N-oxides of 2-methyl-pyrazine.

250 ml. of phosphorous oxychloride are placed in a 3-necked flask equipped with a stirrer and a thermometer. The contents of the flask is cooled to 10° C., and the 44 g. of N-oxide mixture obtained in the manner described above are added portionwise. Cooling is then interrupted. The temperature of the reaction mixture slowly rises to 50° C. The reaction mixture is then refluxed for a further 15 minutes and hereafter concentrated in vacuo. The residue is poured onto ice, neutralized with solid sodium carbonate and extracted with chloroform. The residue obtained by evaporating the chloroform is distilled in vacuo. About 17 g. of a fraction distilling over at 53–54° C./10 torr are collected. This fraction consists of a mixture of the three isomeric 2-methyl-chloro-pyrazines.

The product is dissolved in 25 ml. of methanol, and the solution is added to a sodium methoxide solution prepared from 6 g. of sodium and 150 ml. of methanol. The reaction solution is refluxed for 2 hours. The precipitated sodium chloride is removed by filtration. After removal of the methanol by distillation the residue is taken up in 100 ml. of water. The solution is extracted 4 times with ether, and the residue obtained by evaporation of the ether from the combined extracts is distilled. The fraction distilling at 48–50° C./15 torr is a mixture consisting of about 75% of 2-methyl-3-methoxy-pyrazine and about 25% of 2-methyl-5- and -6-methoxy-pyrazines (the percent being by weight). Yield: 8 g.

The analytical data of this fraction are as follows:

Calculated for $C_8H_8N_2O$: C. 58.05%; H 6.50%. Found: C, 57.86%; H, 6.54%. Physical properties: $n_D^{23}=1.055$; $d_4^{23}=1.082$.

A sample of the mixture is isomers was subjected to gas-chromatographic separation (column with sillicone oil, 40% on Celite; temperature: 200° C.). The retention times (referred to methyl pyrazine: $T_R=1.00$) were $T_R=14.8$ for 2-methyl-3-methoxy-pyrazine and $T_R=1.56$ for the mixture of 2-methyl-5- and -6-methoxy-pyrazines. It was not possible to separate the two last mentioned pyrazines.

The IR spectra of the substituted pyrazines showed the following main vibrations:

2-methyl-3-methoxy-pyrazine: 3480 (w), 2970 (m), 1585 (m), 1550 (s), 1448 (s), 1385 (s), 1340 (s), 1296 (s), 1172 (s), 1010 (s), 976 (s), 872 (m), 837 (s), 767 (w), 751 (w) cm.$^{-1}$. Mixture of 2-methyl-5- and -6-methoxy-pyrazines: 3480 (w), 2975 (m), 1594 (m), 1535 (s), 1433 (s), 1394 (s), 1316 (s), 1255 (s), 1198 (s), 1182 (s), 1141 (s), 1038 (s), 922 (s), 857 (s), 748 (m), 704 (m) cm.$^{-1}$.

It is not possible to separate the individual isomeric pyrazines from their mixture on an industrial scale by the usual physical methods. Therefore, the isomer mixture was used as such as a flavoring agent.

*Example 2*

A solution of 9.6 g. of methylmercaptan in 40 ml. of ethanol is added to a sodium ethoxide solution prepared from 4.6 g. of sodium and 250 ml. of ethanol. Into the resulting mixture there are introduced, while stirring vigorously, 25.7 g. of a mixture of isomeric monochlorinated methyl-pyrazines prepared as described in Example 1. After the exothermic reaction has subsided, the reaction mixture is refluxed for 3 hours. The NaCl which has precipitated is filtered off, and the filtrate is concentrated. The residue is then distilled. There are obtained 21.4 g. of a fraction distilling at 84–88° C./10 torr. This fraction is a mixture containing about 70% by weight of 2-methyl-3-methylmarcapto-pyrazine, the balance consisting of 2-methyl-5- and -6-methylmercapto-pyrazines, as determined by gas chromatography. The analytical data of the mixture are as follows:

Calculated for $C_6H_8N_2S$: C, 51.40%; H, 5.75%. Found: C, 51.05%; H, 5.93%. Physical properties: $n_D^{20}=1.5818$; $n_4^{20}=1.1444$.

It is not possible to separate the individual isomeric pyrazines from their mixture on a commercial scale by means of the usual physical methods. Therefore, the mixture is used as such for flavoring purposes.

*Example 3*

A fondant mass was prepared by boiling for a short time a mixture of 1 kg. of ordinary sugar, 40 g. of glucose and 500 g. of water. Before the mass solidified, 0.07 g. of a 0.1% solution of the mixture of isomeric methyl-methoxy-pyrazines obtained according to Example 1 in triacetin was incorporated in 100 g. of the said mass. Another 100 g. portion of the fondant mass was used as an unflavored reference sample.

The flavored fondant mass was subjected to an organoleptic comparison with the unflavored fondant mass. The fondant mass containing the pyrazine additive differed from the additive-free fondant mass by its pleasant strong taste of roasted almonds.

Substantially the same flavoring effects were obtained by using the same proportion of the product prepared according to Example 2.

*Example 4*

An ice-cream mass was prepared from 1 litre of milk, the yolk of 5 eggs and 250 g. of fine sugar by first stirring the yolk and sugar together and adding the mixture to the boiling milk. To a portion of the resulting cooled mass there was added a 0.1% solution of a mixture of isomeric methyl-methoxy-pyrazine prepared as described in Example 1 in triacetin in the proportion of 0.8 g. of solution per 1 kg. of mass. Another portion of the unflavored mass was used as a reference sample. The two portions were processed to ice-cream in the usual manner in an ice-cream machine.

When tasting and comparing the obtained two icecream samples it was found that the pyrazine containing ice-cream differed from the additive-free ice-cream by having a strong and fine flavor of roasted hazelnuts.

Substantially the same flavoring effects were obtained by using the same proportion of the product obtained according to Example 2.

*Example 5*

A milk pudding liquid was prepared by mixing 25 g. of starch, 74 g. of glucose and 1 g. of salt with 600 ml. of milk and boiling the mixture. To the resulting liquid there was added a 0.1% solution of a mixture of isomeric methyl-methoxy-pyrazines prepared according to Example 1 in triacetin in the proportion of 0.8 g. of solution per 1 kg. of pudding liquid. After solidifying the resulting pudding had a powerful taste of natural roasted hazelnuts.

The pyrazine derivatives of this invention can also be used together with other flavoring ingredients as shown in the following example.

*Example 6*

20 parts by weight of maltol, 2.5 parts by weight of γ-nonalactone, 2.5 parts by weight of benzaldehyde, 25 parts by weight of acetylpropionyl and 10 parts by weight of a mixture of isomeric methyl-methylmercapto-pyrazines prepared according to Example 2 are mixed with 140 parts by weight of benzyl alcohol and 800 parts by weight of triacetin. There is thus obtained a flavoring agent which is capable of imparting to foodstuffs a very fine and well-balanced hazelnut flavor which has a slightly weaker note of roasted nuts than in the case where the pyrazine derivatives are used without the additional flavoring ingredients.

I claim:

1. A compound represented by the general formula

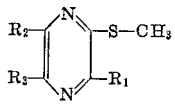

wherein one of the symbols $R_1$, $R_2$ and $R_3$ represents a methyl radical, the other two representing hydrogen.

2. 2-methyl-3-methylmercapto-pyrazine.

3. A composition comprising at least two compounds represented by the general formula

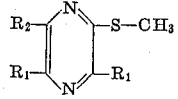

wherein one of the symbols $R_1$, $R_2$ and $R_3$ represents a methyl radical, the other two representing hydrogen.

4. A composition comprising about 70 to 80% by weight of a compound represented by the general formula

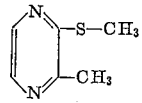

the remaining 20 to 30% of the composition consisting of at least one compound represnted by the formula

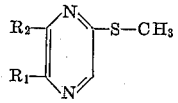

wherein one of the symbols $R_1$ and $R_2$ represents a methyl radical, the other one representing hydrogen.

5. A composition comprising about 70 to 80% by weight of 2-methyl-3-methylmercapto-pyrazine, the remaining 20 to 30% of the composition consisting of at least one of the compounds 2-methyl-5-methylmercapto-pyrazine and 2-methyl-6-methylmercapto-pyrazine.

References Cited

UNITED STATES PATENTS

| | | | |
|---|---|---|---|
| 2,394,963 | 2/1946 | Crossley et al. | 260—250 |
| 2,577,231 | 12/1951 | Clapp et al. | 260—250 |
| 3,112,204 | 11/1963 | Yanick | 99—140 |
| 3,118,771 | 1/1964 | Albrecht et al. | 99—140 |

OTHER REFERENCES

Baxter et al.: J. Chem. Soc., London (1948) p. 1859–60.
Cheeseman: J. Chem. Soc., London (1960) p. 242–7.
Hirchberg et al.: J. Org. Chem., vol. 26, (1961) p. 2356–60.

NICHOLAS S. RIZZO, *Primary Examiner.*